(12) United States Patent
Pasko et al.

(10) Patent No.: US 8,880,693 B2
(45) Date of Patent: Nov. 4, 2014

(54) NETWORK SERVICE PROVIDER-ASSISTED AUTHENTICATION

(75) Inventors: Douglas M. Pasko, Bedminster, NJ (US); Jeffrey H. Swinton, Mendham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1356 days.

(21) Appl. No.: 11/863,751

(22) Filed: Sep. 28, 2007

(65) Prior Publication Data

US 2009/0089409 A1  Apr. 2, 2009

(51) Int. Cl.
*G06F 15/173* (2006.01)
*H04L 29/06* (2006.01)
*G06F 21/62* (2013.01)
*H04L 29/12* (2006.01)

(52) U.S. Cl.
CPC ............ *H04L 63/08* (2013.01); *G06F 21/6218* (2013.01); *H04L 29/12066* (2013.01); *Y10S 707/9994* (2013.01)
USPC ........................ 709/225; 709/226; 707/999.01

(58) Field of Classification Search
CPC . G06F 21/6218; G06F 21/41; H04L 63/0815; H04L 29/12066
USPC .......................................................... 709/245
See application file for complete search history.

(56) References Cited

U.S. PATENT DOCUMENTS

| | | | | |
|---|---|---|---|---|
| 5,708,780 A | * | 1/1998 | Levergood et al. | 709/229 |
| 5,838,916 A | * | 11/1998 | Domenikos et al. | 709/219 |
| 6,006,018 A | * | 12/1999 | Burnett et al. | 709/219 |
| 6,233,618 B1 | * | 5/2001 | Shannon | 709/229 |
| 7,353,542 B2 | * | 4/2008 | Shiga et al. | 726/28 |
| 2002/0007411 A1 | * | 1/2002 | Shaked et al. | 709/229 |
| 2003/0163737 A1 | * | 8/2003 | Roskind | 713/201 |
| 2005/0066043 A1 | * | 3/2005 | Wallman | 709/229 |
| 2006/0041531 A1 | * | 2/2006 | Provoost | 707/3 |
| 2006/0248600 A1 | * | 11/2006 | O'Neill | 726/29 |
| 2006/0281442 A1 | * | 12/2006 | Lee et al. | 455/412.2 |

* cited by examiner

*Primary Examiner* — Rupal Dharia
*Assistant Examiner* — Joe Chacko

(57) ABSTRACT

A data store includes previously collected client data records, each previously collected client data record associated with a respective first network address. A verification module is communicatively coupled to the data store, the module configured to determine that it is a competent verification module and to receive a verification request including user data and a second network address and further configured to respond with an indication of whether the user data corresponds to the previously collected client data record identified by the first network address corresponding to the second network address.

20 Claims, 5 Drawing Sheets

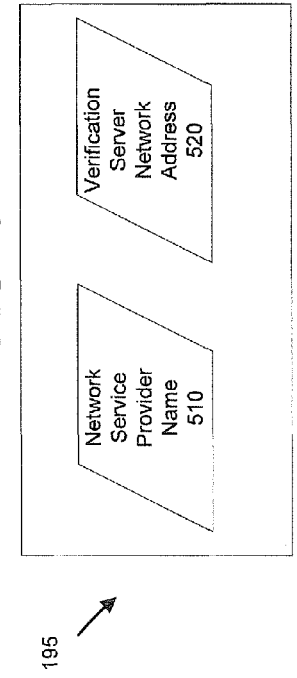
FIG. 3
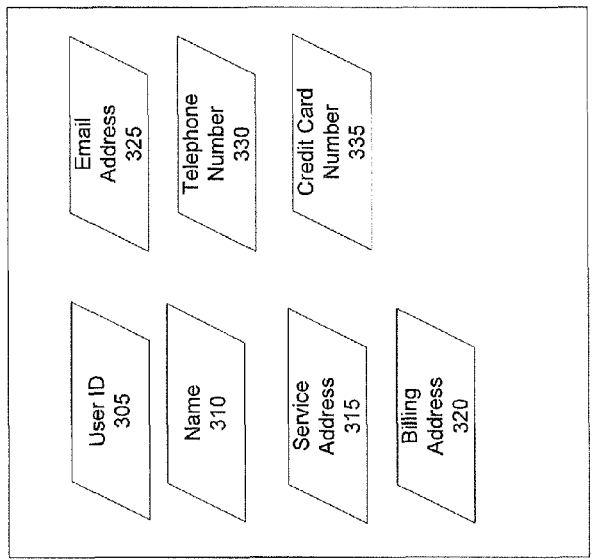
FIG. 4
FIG. 5

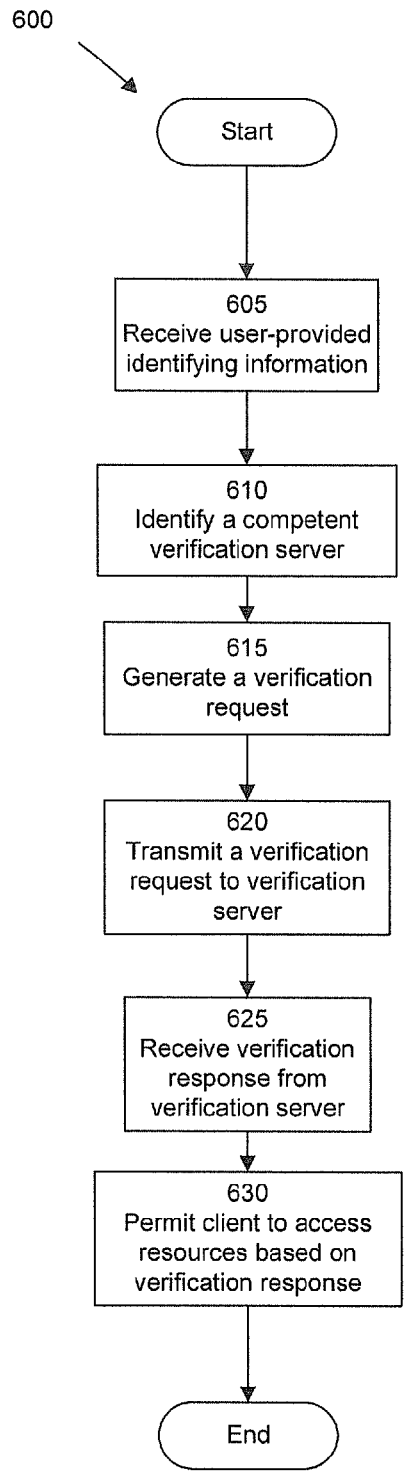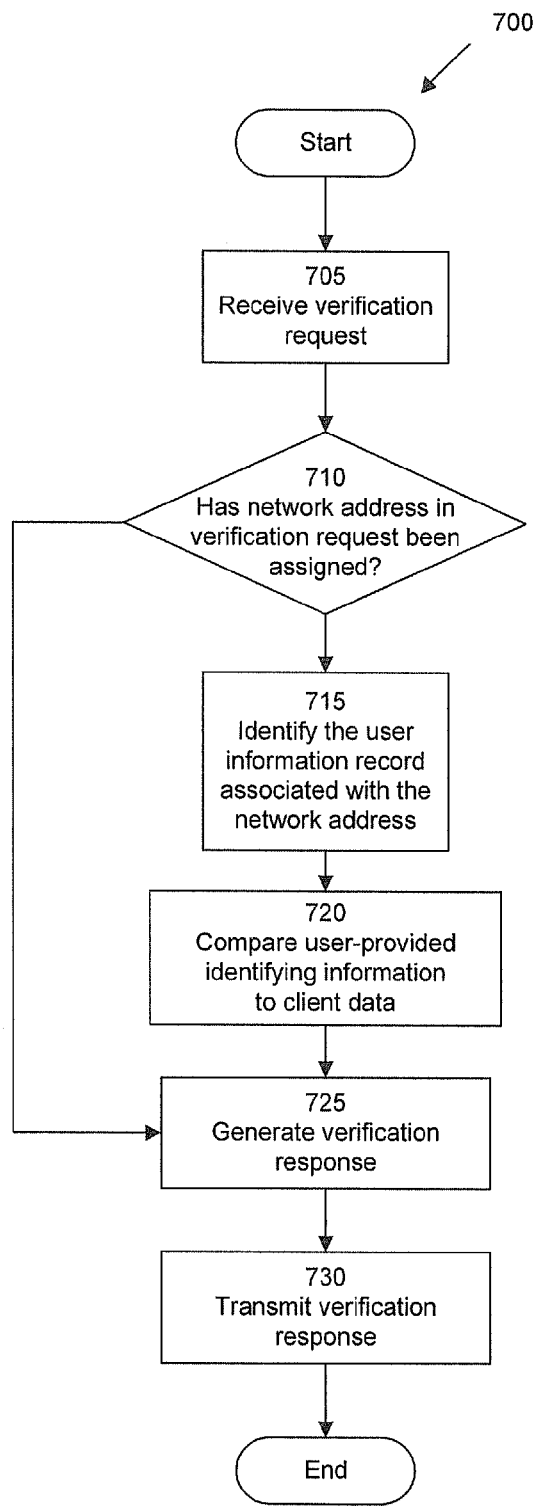
FIG. 6　　　　FIG. 7

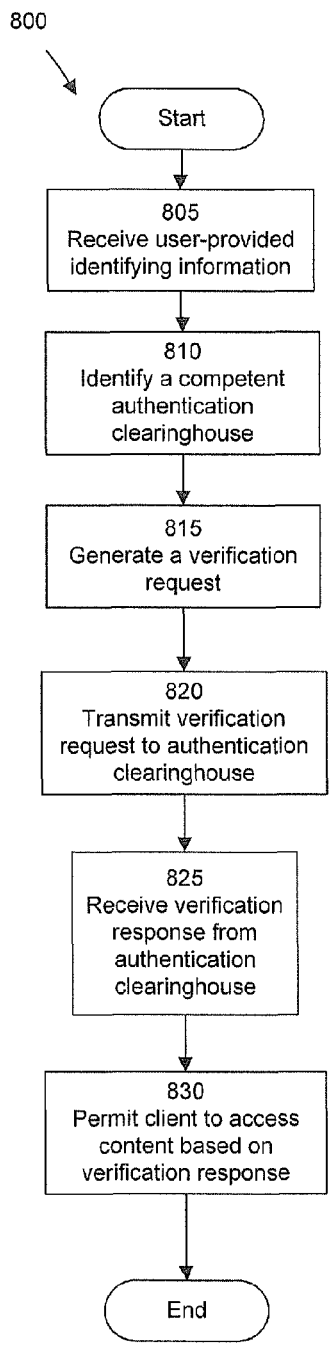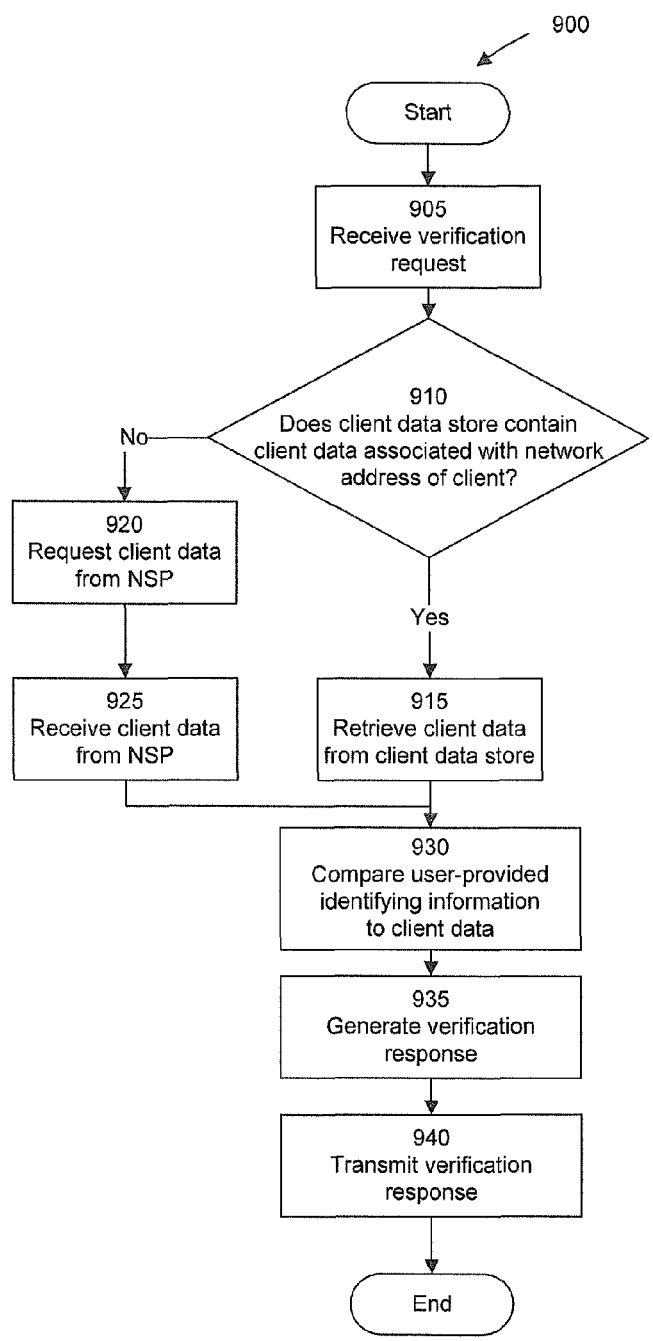
FIG. 8
FIG. 9

NETWORK SERVICE PROVIDER-ASSISTED AUTHENTICATION

BACKGROUND INFORMATION

When a content provider receives a request for content, it may be desirable to verify the identity of the requester prior to providing the content. For example, out-of-band mechanisms may be used to verify the identity of a content requester. An out-of-band mechanism is so-called because it verifies a requestor's identity using a medium different than that of the original request. For instance, if a request is made electronically, identity verification can be implemented via a telephone network, postal mail, or a payment processing system. Verification through the use of a payment processing system typically involves comparing an identity supplied by a content requester to an identity associated with a payment processing system account. A comparison against data from a payment processing system provides evidence that a trustable source confirms the requestor's identity. Payment processing systems are often trusted because an operator of a payment processing system generally has a strong interest in knowing the identities of their account holders so that due payments can be collected.

It is difficult and sometimes even impossible for providers of free services to verify the identity a content requestor. For instance, content servers that allow users to create online profiles, e.g., email systems, social networking systems, etc., have an interest in assuring that users are who they claim to be. To take another example, adults should be restricted from some content servers geared toward children, and vice-versa.

Providers of free content often have limited or no out-of-band verification options. For example, because services that provide free content typically do not require a requestor to supply a payment processing system account, these services presently cannot use a payment processing system to verify the identity of a requester.

BRIEF DESCRIPTION OF THE DRAWINGS

FIG. 3 illustrates an exemplary client data table definition.

FIG. 4 illustrates an exemplary network address data table.

FIG. 5 illustrates an exemplary network address mapping data table definition.

FIG. 6 illustrates an exemplary process for verifying user-provided identifying information with a verification server.

FIG. 7 illustrates an exemplary process for handling a verification request.

FIG. 8 illustrates an exemplary process for verifying user-provided identifying information with a verification server.

FIG. 9 illustrates an exemplary process for handling a verification request.

DETAILED DESCRIPTION OF THE PREFERRED EMBODIMENTS

Figure 1:
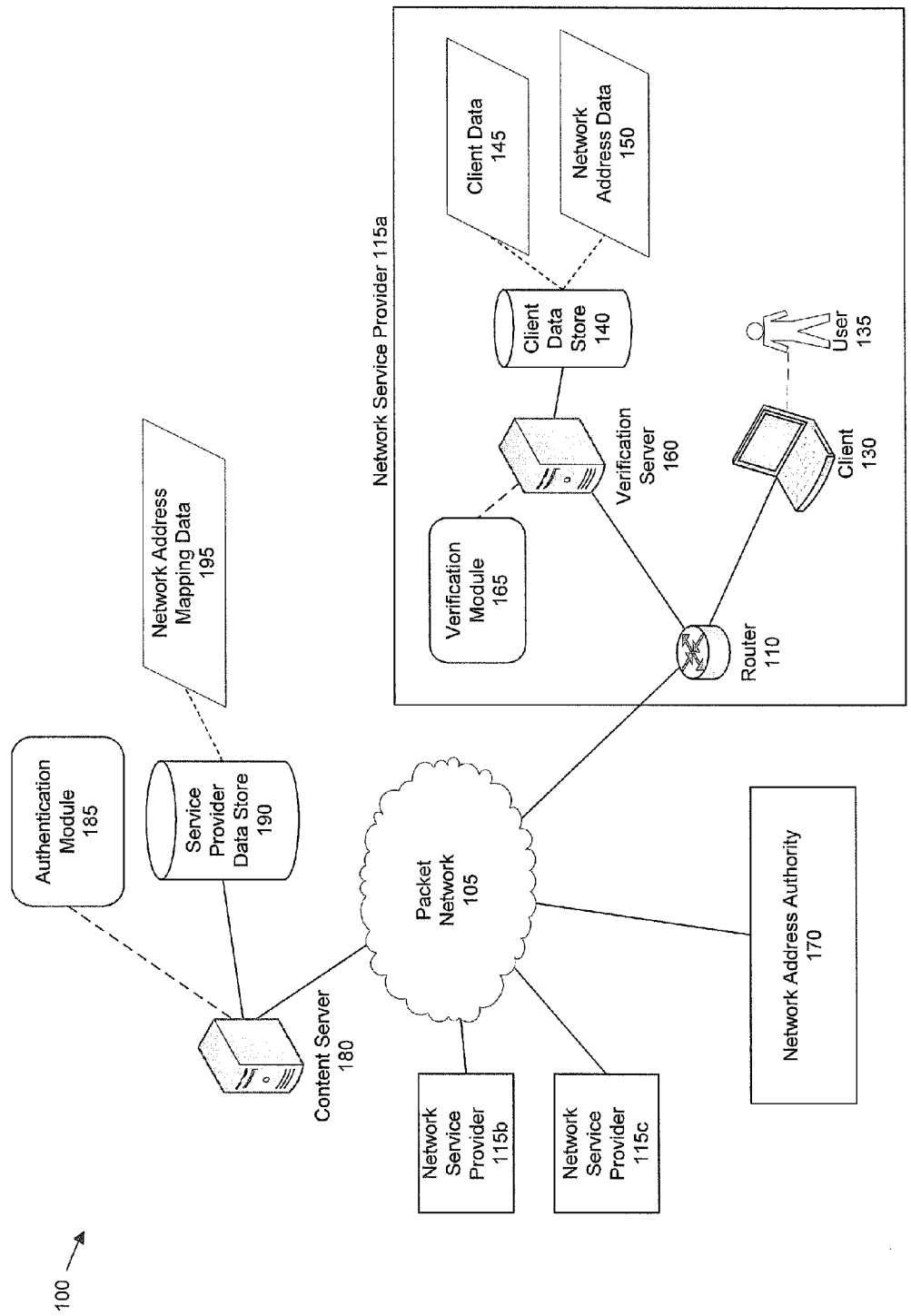
FIG. 1 illustrates a first exemplary network service provider assisted authentication system.

FIG. 1 illustrates an exemplary network service provider-assisted authentication system 100, including a packet network 105, a plurality of network service providers 115a-c, a network address authority 170, and a content server 180. Network service provider (NSP) 115a further includes a client 130, operated by a user 135, and a verification server 160 communicatively coupled to a router 110. Verification server 160 includes a verification module 165 and is communicatively coupled to a client data store 140. Client data store 140 includes client data 145 and network address data 150. Content server 180 includes a authentication module 185 and is communicatively coupled to a service provider data store 190. Service provider data store 190 includes network address mapping data 195. Verification module 165 includes computer instructions for receiving a verification request from authentication module 185 and returning a response based on client data 145.

Packet network 105 is a packet switched communication network e.g., an Internet Protocol (IP) network that is a wide-area network (WAN) such as the Internet. Packet network 105 generally interconnects various computing devices and the like, such as servers 140 and 180, client 130, etc. Interconnections in network 105 may be made by various media including wires, radio frequency transmissions, and optical cables. Packet network 105 generally maintains a common addressing scheme such that each connected device is uniquely addressable by a network address. Routing devices 110 generally interconnect local area networks (LANs) such as NSPs 115a-c, to a WAN, e.g., network 105. Other devices connecting to packet network 105, e.g. switches, intervening routers, etc., are omitted for simplicity of illustration in FIG. 1.

Client 130 generally accesses network 105 via NSP 115a. As depicted in FIG. 1, NSP 115a may include a LAN. FIG. 1 depicts client 130 connecting directly to router 110 of NSP 115a for simplicity of illustration. Client 130 could be a remote client connecting via an intermediary communication mechanism (not shown) such as a telephone network using an analog or DSL modem. Similarly, client 130 could connect to NSP 115a via an intermediary coaxial cable-based broadband network using a cable modem. In all situations, client 130 is considered part of NSP 115a and generally receives a network address from a set of address associated with NSP 115a. Although not illustrated in FIG. 1, NSPs 115b and 115c may include elements similar to those depicted within NSP 115a.

A NSP-assigned network address enables client 130 to communicate with packet network 105 though router 110 of NSP 115a. While FIG. 1 depicts client 130 as a laptop computer, client 130 may be any end user computing device capable of connecting to NSP 115a, such as a workstation, desktop computer, handheld computer, cell phone, or similar device. Such devices include computer instructions including an operating system, a communication stack implementing a communication protocol, and communication software. For example, where packet network 105 includes the Internet, a client device could be a personal computer employing the Microsoft Windows operating system having a TCP/IP communication stack and communication software such as the Microsoft Internet Explorer web browser.

Network service provider 115a may require user 135 of client 130 to provide certain client data 145 prior to receiving networking services. Client data 145 commonly includes data elements such as the name, address, and payment methods of user 135. NSP 115 may store client data 145 in a client data store 140. Client data store 140 may be a relational database management system. Many such systems, including SQL Server, Orcale, and MySQL, among others, are generally available. Client data store 140 generally stores client data 145 in row and column table format. A row, or record, includes one or more columns, or fields, holding data values for specifically defined fields. Rows may be uniquely identified by the values of one or more columns. Indexes of one or more columns can be included to aide in searching for particular rows of the table. FIG. 3, discussed further below, depicts an exemplary client data table definition 300 including the defined fields associated with each column. Other database systems, e.g., embedded databases, hierarchical systems, file based storage, etc., could be used as client data store 140. Client data store 140 includes instructions on a computer readable medium that facilitate the receipt of client data 135. Such instructions could provide a direct interface for entering data or could allow for networked connections to data store 140 through communication protocols such as object database connectivity (ODBC), Java database connectivity (JDBC) or other known techniques for entering data into a networked database.

Generally, after user 135 provides client data 145, client 130 receives a network address from NSP 115a. The assigned network address enables client 130 to communicate over NSP network 115a and thereby access packet network 105 and devices such as a content server 180 connected thereto.

In addition to client data 145, client data store 140 further includes network address data 150. Depending on the configuration provided by NSP 115a, client 130 could use the same network address each time it connects to NSP 115a. Alternatively, NSP 115a may implement software conforming to dynamic host configuration protocol (DHCP), or the like, to provide client 130 with different network addresses upon the passage of a period of time. Any changes to network address assigned to client 130 may be further included in network address data 150. Additionally, usage history including records of occurrences when client 130 used a particular network address to connect to NSP 115a may be included in network address data 150. Client data store 140 further may include instructions on a computer readable medium for receiving network address data 150 directly from network devices through communication protocols such as simple network management protocol (SNMP), and the like.

FIG. 3 illustrates an exemplary client data table definition for storing client data 145. The client data table definition includes exemplary fields of client data 145. The fields of client data 145 may include a user ID 305, a name 310, a service address 315, a billing address 320, an email address 325, a telephone number 330, and a credit card number 335.

FIG. 4 illustrates an exemplary network address data table for storing network address data 150. Network address data 150 includes a user ID field 410 and a network address field 420. User ID 410 is generally in a format to allow for comparison with user ID field 305 of client data 145. Network address data 150 may further include a start time field 430 and an end time field 440. As discussed above, network addresses 420 may be assigned to client 130 on a temporary basis according to a protocol such as DHCP. Start time 430 may indicate the time at which network address 420 is assigned to client. Similarly, end time 440 may store the time when the assignment of network address 420 to client ended.

In general, client data 145 has a high degree of reliability because user 135 is unlikely to falsify identifying information supplied to NSP 115a due to the risk of not receiving network services if client data 145 is inaccurate. For instance, NSP 115a in many instances requires an accurate service address 315 to properly establish service, and generally requires an accurate billing address 320 for billing purposes. In situations where user 135 chooses to pay for networking services with a credit card, payments will likely fail to be made if the name 310 and billing address 320 do not match the name and address associated with the credit card account associated with credit card number 335. Failed payments generally result in a loss of networking services. Accordingly, the name 310 and billing address 320 supplied by user 135 and included in client data 145 will generally match the name and address respectively associated with the payment account identified by credit card number 335.

A verification server 160 communicatively coupled to client data store 140 includes a computer readable medium with instructions for accepting a verification request. Verification server 160 is generally a World Wide Web (WWW) server or a web application server, although any computing device having a computer readable medium including instructions for communicating with client data store 140 in order to process a verification request would suffice. A verification request, described in more detail below, generally includes a network address and at least one element of user-provided identifying information allegedly associated with the supplied network address. Verification server 160 accepts the verification request and compares the supplied identifying information against one or more fields in the previously stored client data 145 and network address data 150. As explained above, client data 145 generally has a relatively high degree of accuracy. Therefore, comparing user-provided identifying information against client data 145 provides a mechanism for verifying that the user-provided identifying information is itself generally accurate and reliable.

Generally, only client data 145 stored in client data store 140 in NSP 115a is available for verification by the NSP 115a. Other NSPs, e.g. NSPs 115b and 115c, do not necessarily collect the same client data 145 as NSP 115a. Accordingly, authentication module 185 may wish to discover which fields of client data 145 are stored in client data store 140. Verification server 160 may maintain a list of the fields of client data 145 that are stored in client data store 140. The list may detail each of the fields of client data 145 by providing field information, e.g., field name, a description of the field, the data type of the field, character limits or other field restrictions, etc. Upon request from authentication module 185, verification module 165 may send the list of fields of client data 145 to authentication module 185.

Devices accessible over a computer network may experience improper use that can lead to security compromises. Accordingly, verification server 160 may implement security precautions such as unidirectional verification and verification request limits. Unidirectional verification requests prevent potentially private client data 145 originating from NSP 115a from being transmitted over packet network 105. Thus, verification server 160 may respond to unidirectional verification requests by indicating whether the user-provided identifying information corresponds to client data 145 without transmitting client data 145 from client data store 140 across network 105.

Another improper use of a network such as network 105 may involve an attempt to discover the client data associated with a network address through repeated verification requests containing partial identifying information. Continuous attempts, each with different identifying information, may eventually result in a verification response that indicates that the supplied identifying information corresponds to client data 145. Accordingly, verification server 160 may limit the number of attempts to verify a particular user 135, e.g., according to a user ID 305 and/or name 310, etc., and additionally may limit the number of verification requests from a particular content server 180. Such limits may reduce the likelihood of determining client data 145 through improper verification requests.

As mentioned above, a network address authority 170 maintains associations between sets of network addresses and the particular network service providers 115 to which particular sets of network address are assigned. Network address authority 170 is accessible via packet network 105. Network address authority 170 may receive and answer requests for identification of NSP 115a associated with a particular network address. Network address authority 170 may be any generalized directory or database server capable of receiving and answering requests from authentication module 185 for identification of an NSP 115a associated with a specified network address. Network address authority 170 may further be able to identify the network address of a verification server 160 that is competent to verify identifying information provided by user 135 against client data 145. Where packet network 105 is the Internet, mapping authority 170 typically is a Regional Internet Registry (RIR) such as the American Registry for Internet Numbers, among others. An RIR is merely one example of network address authority 170. An Internet RIR can respond to a so-called WHOIS request with the entity name of NSP 115a associated with a specified network address. An RIR generally does not maintain listings of verification servers associated with NSP 115a. Accordingly, as will be discussed in more detail below, a network service provider data store 195 could supplement the response provided by network address authority 170 by associating the network address of verification server 160 with the name of NSP 115a.

A content server 180 is connected to packet network 105 and provides content to client 130 upon request. Content is stored on content server 180 in electronic format and can include various types of computer readable data that may be used to render content in one or more formats, e.g., audio, text, still images, moving images, etc. Content server 180 further may conduct bi-directional communication across packet network 105 to negotiate and undertake sending content to client 130. Content server 180 and client 130 generally communicate according to a standard communication protocol. For example, where packet network 105 is the Internet, content servers 180 may be web servers that communicate with clients 130 through use of the hyper-text transfer protocol (HTTP). Content server 180 may also be an application server, which generally provides interactive and dynamic content to client 130. Content server 180 generally implements a specialized interface, such as a graphical user interface, such that user 135 can interact with content server 180 by providing inputs thereto in order to receive content. Examples of content servers 180 include file servers, e-commerce servers, e-mail servers, social networking servers, web servers, etc. The content stored on content server 180 may generally be considered a resource of content server 180. Similarly, in content servers 180 that do not necessarily include discrete content items, such as in the example of a social networking content server 180, a resource of content server 180 may simply be the access and use of content server 180.

Content server 180 may require a requesting user 135 to provide identifying information such as a name and address before providing content, or a resource, to the user 135. For instance, in the example of a social networking content server 180, user 135 may create and store a profile on content server 180 including at least the user's name. When providing identifying information to content server 180, user 135 can provide accurate identifying information or identifying information that is totally or partially inaccurate. Authentication module 185 dedicated to content server 180 attempts to verify that the supplied identifying information corresponds to client data 145 previously provided to NSP 115a by user 135.

Authentication module 185 receives identifying information provided by user 135 through an interactive interface presented by content server 180, e.g., a graphical user interface (GUI) provided in a web page or the like. Authentication module 185 uses client data 145 previously provided to NSP 115a in order to verify the identity of user 135. Authentication module 185 may further rely on a network address of client 130 for verifying an identity of user 135. In one exemplary approach, content server 180 may employ authentication module 185 to verify the identity of user 135 prior to providing a resource to user 135. However, in another exemplary approach, content server 180 may collect the supplied identifying information for a later verification of user 135. For instance, content server 180 may initially provide a resource to user 135, but may condition future access on a later verification request and response. Among other reasons, conducting such a non-real-time verification may allow content server 180 to process a verification request in a batch process along with verification requests for other users.

In yet another exemplary approach, content server 180 may use a verification request and response for purposes other than granting or denying access to a resource. For instance, a verification request and response may be used in order to flag or otherwise indicate that user 135 has a verification status. The verification status may be a fully verified status, an unverified status, or a partially verified status. Additionally, a verification status may include an indication of which user-provided identifying information has been verified. In an exemplary approach, the verification status may be provided by the GUI of content server. Further, the verification status of user 135 may be provided to other users of content server 180. For instance, in a social networking content server 180, a visual indication of the verification status of user 135 may be provided to other users.

As discussed above, NSP 115a includes verification server 160 having access to client data store 140. Content server 180 selectively communicates with verification server 160 in order to verify user-provided identifying information. Within packet network 105, content server 180 uses a network address of verification server 160 in order to communicate therewith. Accordingly, content server 180 is communicatively coupled to a service provider data store 190. As with data store 140, data store 190 may include many different types of data storage mechanisms, e.g., a stand alone RDBMS, an embedded application database, a collection of files, etc. In any configuration, data store 190 maintains network address mapping data 195, which maps the network address of a verification server 160 to a particular network service provider 115a. Each NSP 115a-c may maintain an independent verification server 160 having a unique network address.

FIG. 5 illustrates an exemplary data table definition for storing network address mapping data 195. The network address mapping data table definition includes exemplary fields for mapping a NSP 115a to the network address of a particular verification server 160. The table definition may include fields for a network service provider name 510 and a verification server network address 520. Thus, content server 180, having a record indicating that client 130 is associated with a particular NSP 115a, may determine a network address of the verification server 160 associated with the NSP 115a. As discussed above, network address authority 170 allows content server 180 to determine the NSP 115 to which client 130 is associated based on the network address of client 130.

Figure 2:
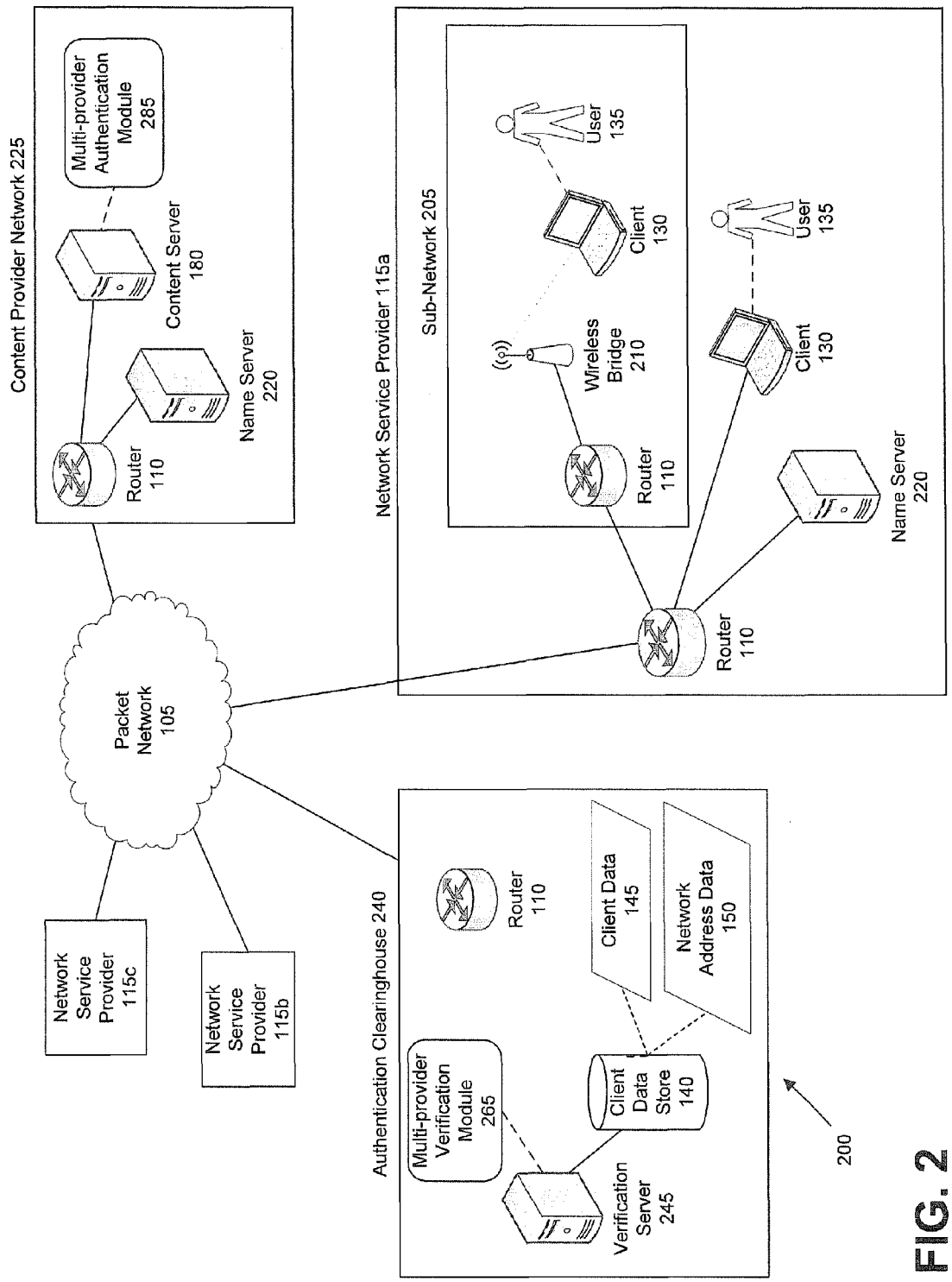
FIG. 2 illustrates a second exemplary network service provider assisted authentication system.

FIG. 2 illustrates an exemplary network service provider-assisted authentication system 200, including a packet network 105, a plurality of network service providers 115a-c, a content provider network 225, and an authentication clearinghouse 240. Certain elements of FIG. 2 were discussed above with reference to FIG. 1. Further, network service provider NSP) 115a includes a name server 220 and a sub-network service provider 205 having a router 110, a wireless bridge 210, a client 130 operated by a user 135. Content provider network 225 includes a router 110, a name server 220, content server 180, and a multi-provider authentication module 285 located on content server 180. Authentication clearinghouse 240 includes router 110 interconnecting a verification server 245 to packet network 105. Verification server 245 includes a multi-provider verification module 265 and is communicatively coupled to client data store 140. Client data store 140 includes client data 145, e.g., as discussed above with reference to FIG. 3, for network service providers 115a-c. Multi-provider verification module 265 includes computer executable instructions for receiving a verification request from authorization module 285 and returning a response based on client data 145.

Verification server 245 may be utilized by a plurality of network service providers 115a-c. Verification server 245 may be any computing device configured for connection to packet network 105. Verification server 245 generally includes computer executable instructions enabling bi-directional communication according to an established communication protocol. Generally, verification server 245 is a web application server or the like. Web application servers may accept remote procedure calls via HTTP, thereby processing data on behalf of a remote system. As is described in further detail below, multi-provider verification module 265 receives verification requests including user-provided identifying information from content server 180 and compares the identifying information to client data 145 and network address data 150 stored in client data store 140.

Authentication clearinghouse 240 includes authentication server 245 and maintains client data store 140. Authentication clearinghouse 240 thereby pools and stores client data 145 and network address data 150 from numerous network service providers 115a-c. Network service providers 115a-c initially generate client data 145 and network address data 150 as described above. NSPs 115a-c may periodically submit the generated client data 145 and network address data 150 to authentication clearinghouse 240 for storing in client data store 140. Alternatively, in situations where it is undesirable for authentication clearinghouse 240 to receive and store client data 145 and network address data 150 for all clients 130 of NSP 115a, authentication server 245 may communicate with NSP 115a during the processing of a verification request in order to receive only such client data 145 and network address data 150 that is needed for the current request.

Although not illustrated in FIG. 2, multiple authentication clearinghouses 240 may be connected to packet network 105. However, a particular authentication clearinghouse 240 is competent to handle verification requests for client 130 having client data 145 and network address data 150 stored in client data store 140. Additionally, authentication clearinghouse 240 may be competent for client 130 if it is permitted to access client data 145 associated with client 130 from NSP 115 during the processing of a verification request. NSP 115 may maintain relationships with one or more authentication clearinghouses 240 such that only certain authentication clearinghouses 240 are permitted to access and store client data 145 and network address data 150 pertaining to client 130 of NSP 115a. Accordingly, multi-provider authentication module 285 determines which of potentially numerous authentication clearinghouses 240 is a competent authentication clearinghouse 240 for a particular NSP 115. Name servers 220 provide one possible technique to identify the competent authentication clearinghouse 240 for a particular client 130 and NSP 115.

Name servers 220 may assume the roles of service provider data store 190 and network address mapping data 195 described above with respect to system 100. In a packet network 105 such as the Internet, a domain name system maps various data elements to a particular network address. Name servers include computer instructions that implement the protocols of the domain name system. Most often, a name server is responsible for mapping a network address to an alpha-numeric domain name. However, name servers are not limited to simply mapping a network address to an alphanumeric domain name. Any number of mapping records may be defined. Because of the flexibility of the domain name system, a new domain name record could be defined that would map the address of a competent authentication clearinghouse to a client's network address. The Internet domain name system relies on a hierarchy of name servers such that each network generally includes a local name server. Accordingly, NSP 115a may populate its name server 220 with the relevant data mapping its network addresses to a particular verification server 245. This mapping would then be made available to name server 220 of content provider network 225 through the domain name system hierarchy.

FIG. 2 further depicts a sub-network 205 of NSP network 115a. Subdividing a network into a sub-network 205 is generally done for the purpose dividing network management responsibilities. Sub-network 205 may include a wireless bridge 210 in order to provide a wireless network connection to client 130. Sub-network 205 may be assigned only a single network address from NSP 115a which must be used by client 130 as well as any additional clients (not shown). Sub-network 205 may implement network address sharing software such as network address translation (NAT), and the like, in order to share the network address. Accordingly, client data store 140 may be configured to accept client data 145 and network address data 150 for multiple clients 130 and users 135 sharing the network address assigned to sub-network 205.

Computing devices such as content server, verification service, and client, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as content server, authentication server, verification server, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Data stores 140 and 190 each generally include a relational database management system (RDBMS). An RDBMS generally employs Structured Query Language (SQL) in addition to a language for creating, storing, editing, and executing stored procedures, such as the PL/SQL language mentioned above. However, it is to be understood that data stores 140 and 190 may be some other kind of database such as a hierarchical database, a set of files, an application database in a proprietary format, etc. Each database 140 and 190 generally includes a computing device employing a computer operating system such as one of those mentioned above, and are accessed via a network in any one or more of a variety of manners, as is well known. Exemplary systems are possible in which at least some of data stores 140 and 190 are both included in one RDBMS or are located within a single computing device.

FIG. 6 illustrates an exemplary process 600 for verifying client data received by content server 180 through the assistance of verification server 160. Content server 180 generally includes a computer-readable medium having stored instructions for carrying out certain operations described herein, including some or all of the operations described with respect to process 600. For example, some or all of such instructions may be included in authentication module 185.

Process 600 begins in step 605 when authentication module 185 initiates a verification request, which verification request is subsequently generated as described in step 615 below. Initiating the verification request in the authentication module 185 generally includes receiving identifying information from a user 135 who requested content from content server 180. Content server 180 may provide a graphical user interface (GUI) in a web page, or the like, for user 135 to enter identifying information. The GUI may include textual input fields, or other mechanisms for receiving input, to receive user-provided identifying information.

Next, in step 610, authentication module 185 determines the network address of a verification server 160. A large network 105 may have multiple network service providers 115a-c each maintaining their own verification server 160. A particular verification server 160 is generally only competent to verify users having client data 145 and network address 150 data in client data store 140. Accordingly, the authentication module 185 determines the network address of client 130 which is then used to determine the address of a competent verification server 160. Authentication module 185 makes the determination of this step 610 by accessing service provider data store 190 having data 195 that maps a client network address to a verification server 160. Such mappings could exist due to a prearranged relationship between content server 180 and NSP 115a. Alternatively, a network address authority 170 may identify NSP 115a responsible for the network address of client 130. The NSP 115a may then be scanned or polled to determine the address of a verification server 160. The determined address of verification server 160 may be stored in service provider data store 190 for future use. Alternatively, network address authority 170 may additionally maintain a mapping of a verification server 160 to a range of network addresses associated with NSP 115a.

Next, in step 615, authentication module 185 generates a verification request including user-provided identifying information. The verification request further includes a network address of client 130 on network 105. Authentication module 185 may or may not include instructions concerning of the types of client data 145 held in client data store 140, which is the only data available for verification by verification server 160. Accordingly, all user-provided identifying information may be transmitted to verification server 160 such that verification server 160 is responsible for parsing data and identifying data elements that are available for verification. Alternatively, verification server 160 may provide a list detailing client data 145 that is available for verification as well as any formatting or delimiting requirements for data elements. So-called structured data formats, e.g., extensible markup language (XML) or the like, could be used to list client data 145 that is available for verification. Similarly, the verification request itself may be generated in a structured data format. As discussed above, in one exemplary approach a verification request may be generated some time after client 130 accesses content server 180. In such an approach, content server may record the time that client 130 accessed content server 180 along with the network address of client 130 at the recorded time. The time of access may be included with verification request. Including the time of access in the verification request may be required if, as explained above, NSP 115a only provides a network address to client 130 for a limited period of time, e.g., when NSP 115a uses DHCP software.

Next, in step 620, the verification request generated in step 615 is transmitted to the verification server 160 identified in step 610.

Next, in step 625, the authentication module 185 receives a response from the verification module 185. Process 700, described in detail below, describes the steps taken in verification module 185 to provide a response. A response may provide an affirmative or negative answer to the verification request based on user-provided identifying information being verified by comparison to one or more fields of client data 145. A response may further indicate that some but not all user-provided identifying information fields were verified by corresponding fields of client data 145. Accordingly, such a response may include an indication of which, if any, fields of client data 145 corresponded to the user-provided identifying information. A response indicating which, if any, fields of user-provided identifying information were verified by corresponding fields of client data 145 provides additional information from which content server 180 can base its decision of whether or not to permit client 130 to access the requested content.

Next, in step 630, client 130 may be permitted or denied access to the requested resource based on the verification response. It cannot be assumed that all content servers 180 value particular user-provided identifying information elements equally for the purpose of verifying a user 135. For instance, some content servers 180 may be programmed to weigh a verified name more heavily than a verified address and therefore may allow a requesting client 130 to access a resource even without a verified address so long as the name of user 135 is verified. Accordingly, a verification response may simply detail which if any user-provided identifying information fields were verified according to corresponding client data 145 fields thereby allowing the content server 180 the ability to determine whether a user 135 has been sufficiently verified based on its own criteria. In an exemplary approach, content server 180 may permit access to only a portion of available resources based on a verification response only verifying certain user-provided identifying information. In another exemplary approach, content server 180 may provide access to a resource regardless of whether user 135 has been verified, but may determine a verification status for user 135 based on the verification response. Additionally, the verification status may be provided to user 135 or other users.

Following step 630, process 600 ends.

FIG. 7 illustrates an exemplary process 700 for verifying user-provided identifying information received by verification server 160. Verification server 160 generally includes a computer-readable medium having stored instructions for carrying out certain operations described herein, including some or all of the operations in process 700. For example, such instructions may be included in verification module 165.

Process 700 begins in step 705 when a verification request according to step 615 of process 600 is received by verification module 165. As explained above, a verification request includes a network address of client 130 and one or more elements of user-provided identifying information. Depending on the transmission format, the received request may need to be parsed to identify specific data fields that are capable of being verified. For instance, all user-provided identifying information could be sent with the authorization requests despite the fact that only a subset of the provided information is stored in the client data store 140.

Next, in step 710, it is determined whether the network address included in the verification request has been assigned to a client 130. Client data store 140 includes network address data 150 including network address assignments. The process queries the network address data 150 to determine if the supplied network address has been assigned to a client 130. If the network address has been assigned, verification module 165 stores the unique client identifier and continues to step 715. However, if the network address has not been assigned to a client 130, process 700 proceeds to step 725.

Next, in step 715, verification module 165 retrieves from client data store 140 all client data fields associated with the client identifier specified in step 710. A query of the client data store 140 requesting such client data fields may retrieve all client data 145 or merely a subset of the data 145 based on the fields of identifying information provided with the verification request. For instance, if the verification request only includes a name field with the user-provided identifying information, then verification module 165 need only retrieve the name field of the client data 145 for comparison.

Next, in step 720, verification module 165 compares the supplied identifying information to the retrieved client data 145. It should be recognized that formalities such as minor differences in the use of punctuation, abbreviations, capitalization, etc. could result in an incorrect determination that the user-provided identifying information does not correspond to client data 145. Accordingly, the user-provided identifying information may be modified to correspond with the formalities of client data store 140. For instance, certain abbreviations may be removed or expanded. As a further example, punctuation may be removed. However, because authentication module 185 generally controls the verification process, verification server 160 may provide selectable options regarding any modification of user-provided identifying information. As discussed above, verification module 165 may provide to requesting authentication modules 185 a list of available client data 145. Any selectable options regarding modifications may be indicated in or along with the list. Accordingly, the verification request could include the preferences of the authentication module 185 regarding to what extent, if any, verification module 165 is permitted to modify the user-provided identifying information. Merely by way of example, an address field of the user-provided identifying information may include an attribute indicating that verification module 165 is permitted to expand abbreviations.

Next, in step 725, verification module 165 generates a verification response. The verification response may indicate the degree to which the user-provided identifying information corresponded to the client data 145. For example, the indication may include indicators such as "exact match," "partial match," or "no match." The degree of correspondence could be determined in various ways, e.g., based on a percentage of matching characters, based on a phonetic equivalents, etc.

Next, in step 730, verification module 165 transmits the verification response to the requesting authentication module 185.

Following step 730, process 700 ends.

FIG. 8 illustrates an exemplary process 800 for verifying user-provided identifying information received by content server 180 through the assistance of an authentication clearinghouse 240. Content server 80 generally includes a computer-readable medium having stored instructions for carrying out certain operations described herein, including some or all of the operations in process 800. For example, such instructions may be included in multi-provider authentication module 285.

Process 800 begins in step 805 when a verification request is initiated in multi-provider authentication module 285, such verification request to be generated as described below in step 815. Step 805 generally includes operations described above with reference to step 605.

Next, in step 810, multi-provider authentication module 285 identifies a competent authentication clearinghouse 240. Multi-provider authentication module 285 may include instructions identifying a competent authentication clearinghouse 240 as well as the network address of verification server 245. For instance, multi-provider authentication module 285 may always send a verification request to the same authentication clearinghouse 240. Alternatively, multi-provider authentication module 285 may need to determine which authentication clearinghouse 240 among potentially many authentication clearinghouses 240 is competent to handle the verification request based on the network address of client 130. Accordingly, multi-provider authentication module 285 may query a name server 220 using the network address of client 130 to determine the competent authentication clearinghouse 240 for client 130. Name server 220 then generally responds with the network address of the verification server 245.

Next, in step 815, multi-provider authentication module 285 generates a verification request. Step 815 generally includes operations described above with reference to step 615.

Next in step 820, multi-provider authentication module 285 transmits the verification request generated in step 815 to multi-provider verification module 285 on verification server 245 of the competent authentication clearinghouse 240 identified in step 810.

Next, in step 825 multi-provider authentication module 285 receives a verification response from authentication clearinghouse 240. Process 900, described in detail below, describes steps taken in the multi-provider verification module 285 to provide the response. Step 825 generally includes operations described above with reference to step 625.

Next, in step 830 client 130 may be permitted or denied access to the requested content based on the verification response. Step 830 generally includes operations described above with reference to step 630.

Following step 830 process 800 ends.

FIG. 9 illustrates an exemplary process 900 for verifying user-provided identifying information received by verification server 245. Verification server 245 generally includes a computer-readable medium having stored instructions for carrying out certain operations described herein, including some or all of the operations in process 900. For example, such instructions may be included in multi-provider verification module 265.

Process 900 begins in step 905 when a verification request according to step 820 of process 800 is received by multi-provider verification module 265. Step 905 generally includes operations described above with reference to step 705. As explained above, a verification request includes a network address of client 130 and one or more elements of user-provided identifying information.

Next in step 910, it is determined whether client data store 140 contains records for the network address included with the received verification request. The network address data 150 of client data store 140 is queried based on the network address included with the verification request. Client data store 140 may have received client data 145 and network address data 150 from NSP 115 at an earlier time. In such circumstances, client data store 140 may have client data 145 associated with the network address. Alternatively, verification server 150 may have to contact NSP 115 in order to receive client data 145 related to the network address included with the verification request. If client data store 140 includes client data 145 related to the network address, then the process proceeds to step 915. Otherwise the process proceeds to step 920.

In step 915, multi-provider verification module 265 retrieves client data 145 from client data store 140. The query of the client data store 140 may retrieve all client data 145 or merely a subset thereof based on the elements of identifying information provided with the verification request.

In step 920, multi-provider verification module 265 contacts the NSP 115a of client 130 to access client data 145 related to the network address included with the verification request.

Next in step 925, multi-provider verification module 265 receives any relevant data 145 from NSP 115 that was requested in step 920. The received client data 145 may be stored in client data store 140 for future use.

After either of steps 925 and 915 the multi-provider verification module 265 proceeds to step 930. In step 930, the retrieved client data 145 is compared to the user-provided identifying information included with the verification request. Step 930 generally includes operations described above with reference to step 720.

Next in step 935, multi-provider verification module 265 generates a verification response. Step 935 generally includes operations described above with reference to step 725.

Following step 940, process 900 ends.

Accordingly, systems 100 and 200 assist a content server 180 in authenticating a client 130 through a comparison of user-provided identifying information against previously stored client data 145 collected by the NSP 115a of client 130. In system 100, an authentication module 185 collects user-provided identifying information and verifies the collected information according to the steps of process 600. Verification module 165 dedicated to NSP 115a, receives the verification request from authentication module 185 and compares the user-provided identifying information against client data 145 held in client data store 140 according to the steps of process 700. A response indicating whether the user-provided identifying information corresponds to client data 145 is then returned to the authentication module 185. In system 200, a multi-provider authentication module 185 collects user-provided identifying information and verifies the collected information according to the steps of process 800. Multi-provider verification module 265 receives the verification request from authentication module 285 and compares the user-provided identifying information against client data 145 held in client data store 140 according to the steps of process 900. Client data store 140 communicatively coupled to verification server 245 includes client data 145 for a plurality of network service providers 115. A response indicating whether the user-provided identifying information corresponds to client data 145 is then returned to the authentication module 285. Thus, content server 180 having received a verification response may permit client 130 to access a resource based on its own determination of the sufficiency of the response.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

We claim:

1. A method, comprising:
receiving, in a computing device, user data from a client;
determining a network address of the client;
determining which of a plurality of verification modules is a competent verification module for the client by querying one or more databases, the plurality of verification modules storing previously collected client data received from a plurality of network service providers, wherein the one of the plurality of verification modules to which the network address of the client is mapped is determined to be the competent verification module for the client, and the one or more databases map a given client's network address to a given verification module when the given verification module is able to access stored data related to the given client;
sending a request including at least the user data and the network address to the competent verification module for the client; and
receiving a response from the competent verification module including an indication of whether the user data corresponds to an instance of the previously collected client data that is associated with the network address,
wherein the querying of the one or more databases includes one of:
querying a first database that maps client network addresses to corresponding network service provider identities and then querying a second database that maps network service provider identities to corresponding ones of the plurality of verification modules; and
querying a single database that directly maps client network addresses to corresponding ones of the plurality of verification modules.

2. The method of claim 1, wherein each instance of the previously collected client data was collected by a corresponding one of the plurality of network service providers that is responsible for the network address that is associated with the respective instance of client data.

3. The method of claim 1 further comprising selectively allowing the client to access a resource based on the response.

4. The method of claim 1, wherein the user data comprises a set of user data elements and the previously collected client data comprises a set of client data elements, and wherein the response indicates that a subset of the user data elements corresponds to a respective subset of the client data elements.

5. The method of claim 1, further comprising determining a verification status of the user, wherein the verification status is based on the response.

6. The method of claim 5, further comprising providing the verification status to one or more users.

7. The method of claim 1, wherein the indication of whether the user data corresponds to the previously collected client data includes a degree to which the user data corresponds to the previously collected client data.

8. A method, comprising:
receiving a request including a network address and user data;
identifying, based on the request, a competent authentication clearinghouse for the network address from a plurality of authentication clearinghouses by querying one or more databases, the plurality of authentication clearinghouses storing previously collected client data received from a plurality of network service providers, wherein the one of the plurality of authentication clearinghouses to which the network address is mapped is identified as the competent authentication clearinghouse for the network address;
submitting the request to the competent authentication clearinghouse;
comparing, in the competent authentication clearinghouse, the user data to at least one client account field included in the previously collected client data associated with the network address; and
receiving a response to the request from the competent authentication clearinghouse, the response configured to provide an indicator relating to whether the request should be granted,
wherein the querying of the one or more databases includes one of:
querying a first database that maps client network addresses to corresponding network service provider identities and then querying a second database that maps network service provider identities to corresponding ones of the plurality of authentication clearinghouses; and
querying a single database that directly maps client network addresses to corresponding ones of the plurality of authentication clearinghouses.

9. The method of claim 8, further comprising
generating, in the competent authentication clearinghouse, the response based at least in part on the comparing.

10. The method of claim 9, wherein each instance of the previously collected client data was collected by a corresponding one of the plurality of network service providers that is responsible for the network address that is associated with the respective instance of client data.

11. The method of claim 9, wherein the previously collected client data is a client data record of a set of client data records stored in a client data store, and wherein the set of client data records was collected by the plurality of network service providers.

12. The method of claim 9, wherein the request further includes at least one comparison parameter, the method further comprising adapting the comparing based on the comparison parameter.

13. The method of claim 8, further comprising ignoring the request from a requestor based on the requestor exceeding a predetermined number of allowable requests.

14. A system comprising:
a computing device having a processor and a memory storing an authentication application that is executable by the processor and configured to, when executed by the processor cause the computing device to receive user data from a client;
one of more data stores including network address mapping data that maps client network addresses to corresponding ones of a plurality of verification modules communicably coupled to the computing device, the plurality of verification modules storing previously collected client data received from a plurality of network service providers, the network address mapping data mapping a given client's network address to a given verification module when the given verification module is able to access stored data related to the given client,
wherein the authentication application is configured to, when executed by the processor, cause the computing device to identify a competent verification module for the client by querying the one of more data stores, and to send a request including the user data and the client's network address to the competent verification module, the competent verification module being configured to compare the user data to stored data related to the given client and respond with an indication of whether the user data corresponds to the stored data related to the given client, wherein the querying of the one or more data stores includes one of:

querying a first data store that maps client network addresses to corresponding network service provider identities and then querying a second data store that maps network service provider identities to corresponding ones of the plurality of verification modules; and querying a single data store that directly maps client network addresses to corresponding ones of the plurality of verification modules.

15. The system of claim 14, wherein the competent verification module is further configured to accept at least one comparison parameter, and to base the indication on the comparison parameter.

16. The system of claim 14, wherein the competent verification module is further configured to ignore the verification request from a requestor based on the requestor exceeding a predetermined number of allowable requests.

17. The method of claim 1, further comprising comparing, in the competent verification module, the user data to at least one client account field included in previously collected client data associated with the network address.

18. The method of claim 1, further comprising receiving a verification module address corresponding to the competent verification module after the competent verification module has been determined.

19. The method of claim 8, wherein the competent authentication clearinghouse is identified by a multi-provider authentication module at a content server.

20. The method of claim 19, further comprising receiving an authentication module address corresponding to the competent authentication module from the multi-provider authentication module.

* * * * *